United States Patent [19]

Grünleitner et al.

[11] 4,211,962
[45] Jul. 8, 1980

[54] BRUSHLESS D-C MOTOR

[75] Inventors: Hans Grünleitner, Nuremberg; Georg Kögler, Schwabach; Hans Köhnlein; Peter Tschirner, both of Nuremberg, all of Fed. Rep. of Germany

[73] Assignee: Siemens Aktiengesellschaft, Berlin & Munich, Fed. Rep. of Germany

[21] Appl. No.: 862,421

[22] Filed: Dec. 20, 1977

[30] Foreign Application Priority Data

Dec. 28, 1976 [DE] Fed. Rep. of Germany ....... 2659233

[51] Int. Cl.² ........................................... H02K 23/00
[52] U.S. Cl. .................................... 318/254; 310/71; 318/749; 339/32 M
[58] Field of Search ................ 318/138, 254, 65, 280, 318/296, 300, 749; 339/32 R, 32 M, 33; 310/66, 239, 71

[56] References Cited

U.S. PATENT DOCUMENTS

| 2,792,559 | 5/1957 | Maberry | 339/32 R |
| 2,922,054 | 1/1960 | Miller | 339/32 M |
| 3,477,001 | 11/1969 | Spinrad | 318/749 |
| 3,831,072 | 8/1974 | Tanikoshi | 318/138 |

FOREIGN PATENT DOCUMENTS 2553535 6/1927 Fed. Rep. of Germany ........ 339/32 M

Primary Examiner—J. V. Truhe
Assistant Examiner—John W. Redman
Attorney, Agent, or Firm—Kenyon & Kenyon

[57] ABSTRACT

A brushless d-c motor having an electric commutation circuit in which the motor and circuit are inter-connected by a mating connector is disclosed. The mating parts of the connector may be connected in two configurations. In one configuration, the motor rotates in one direction and in the other configuration, the motor rotates in the opposite direction. The mating connector is disclosed as a plug connector having a plug and a mating jack in which the connection of the motor and circuit to the pin connectors of the plug and to the jack connectors of the jack, and the arrangement of the pin connectors and jack connectors is such that the motor rotates in opposite directions in the two configurations.

29 Claims, 3 Drawing Figures

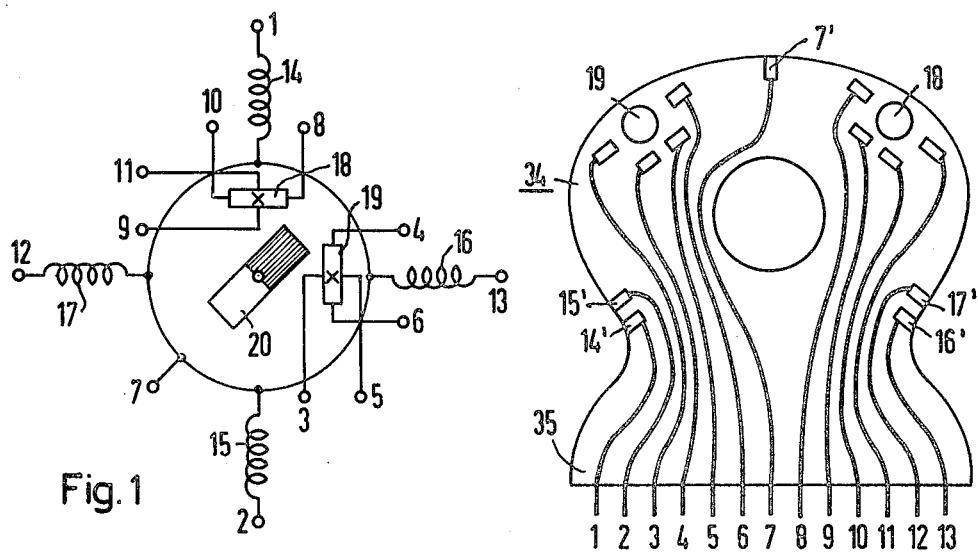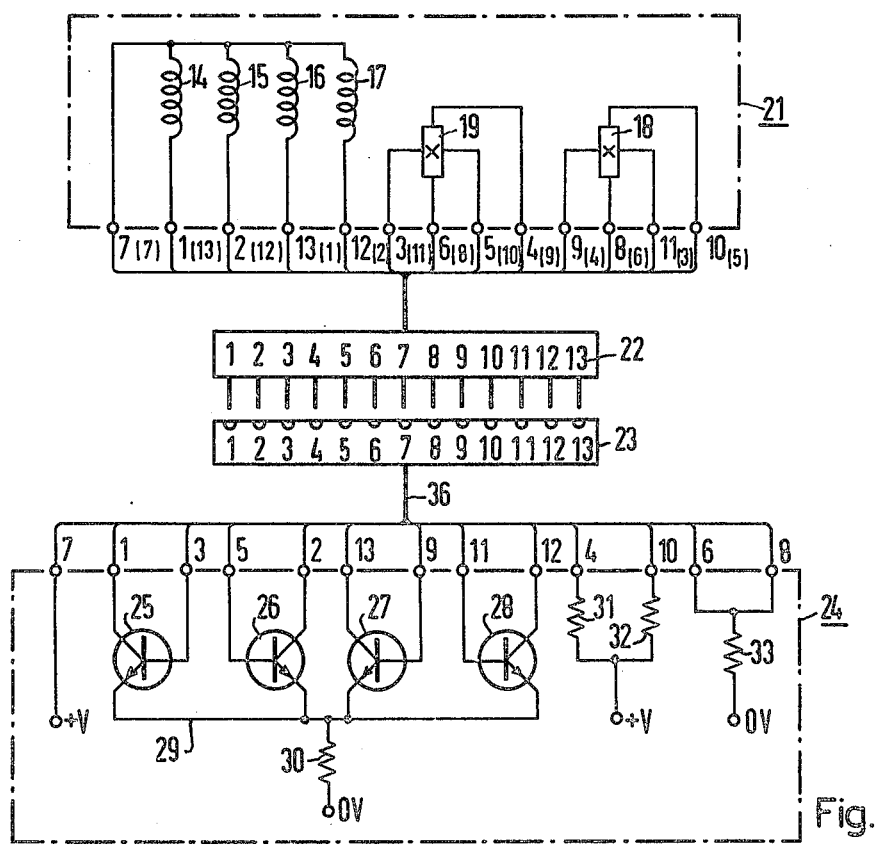

BRUSHLESS D-C MOTOR

BACKGROUND OF THE INVENTION

The present invention relates to brushless d-c motors having electric commutation circuits in which the motor is connected to the commutation circuit by a mating connector.

Electrically commutated d-c motors are often connected to the associated control or commutation circuit via plug connectors. For economic reasons, simple plug connectors are usually chosen in which the connector pins and the connector jacks are arranged symmetrically about the connector axis, there being at least two configurations in which the plug and jack of the connector may be joined. Such plug connectors are simple and inexpensive. However, there exists the danger of damaging or destroying the motor and/or the electric commutation circuit if the two connector parts are not joined together in the correct configuration. One way of preventing damage to, or destruction of, the motor and/or circuit is to provide means in the connector to prevent the connector parts from being incorrectly joined. However, this increases the cost of the connector considerably.

In motors with simple commutation circuits, the direction of rotation of the motor is determined as a rule in the factory. If it is desired, however, to change the direction of rotation of the motor, appropriate changes must be made in the motor and/or the commutation circuit, such as reversing the polarity of the windings or of the control circuit, and the like. This is usually accomplished by resoldering wire jumpers, resoldering the leads of the stator windings or the like. The possibility of damaging or destroying the motor and/or the circuit, however, still exists because the connections can be made incorrectly.

SUMMARY OF THE INVENTION

It is an object of the present invention to provide a brushless d-c motor having an electric commutation circuit in which simple, inexpensive plug connectors can be used to inter-connect the motor and circuit without the possibility of damaging or destroying the motor and/or circuit by incorrectly connecting the mating parts of the connector. It is a further object of the present invention to provide a mating connector with associated connections to the motor and circuit in which a change of rotation of the motor is obtained according to the configuration in which the mating parts of the connector are joined.

According to the invention, a brushless d-c motor and an electric commutation circuit therefor are electrically inter-connected by a mating connector so that no damage can occur to the motor or circuit in any of the mating connections or configurations of the connector parts. Further in accordance with the invention, two mating configurations of the connector are provided so the direction of rotation of the motor is reversed in the two mating configurations.

In a disclosed embodiment of the invention, a brushless d-c motor is provided comprising an electric commutation circuit and a mating connector electrically inter-connecting the motor and the circuit. The connector comprises a plug having a plurality of connector pins and a jack having a plurality of connector jacks, the connector pins being electrically connected to either the motor or the circuit and the connector jacks being electrically connected to the other of the motor and the circuit. The connector pins and the connector jacks are arranged, and the connector pins and the connector jacks are electrically connected to the motor and circuit so that the plug and jack may be connected in two configurations. One of the two configurations provides rotation of the motor in one direction and the other of the two configurations provides rotation of the motor in the opposite direction. The connector pins and the connector jacks mating therewith are assigned in such a manner that one direction of rotation of the motor is associated with each of the two possibilities of joining the mating parts of the connector together.

This can be accomplished in a simple manner by arranging the leads of Y-connected motor windings and the leads of the control elements of the commutation circuit symmetrically about the axis of the connector. In the case of a brushless d-c motor with an electric commutation circuit controlled by Hall generators, the assignment of the connector pins is made so that not only the motor windings leads but also the control current and Hall voltage leads of the Hall generators are mutually interchanged in the two mating configurations of the connector.

These and other aspects of the present invention will be more apparent from the following description of the preferred embodiment thereof when considered with the accompanying drawings.

BRIEF DESCRIPTION OF THE DRAWING

The present invention is illustrated by way of example and not limitation in the figures of the accompanying drawings in which like references indicate similar parts and in which:

FIG. 1 is a schematic circuit diagram of an electrically commutated d-c motor having Hall generators as position transmitters;

FIG. 2 is a schematic circuit diagram of the motor shown in FIG. 1 and of a simplified commutation circuit showing the pin connector and jack connector assignments and the interconnection of the motor and commutation circuit; and FIG. 3 is an illustration of a circuit board for the motor shown in FIGS. 1 and 2.

DESCRIPTION OF THE PREFERRED EMBODIMENT

The stator winding of the brushless d-c motor shown in FIG. 1 comprises four phase windings 14–17 and two Hall generators 18 and 19. The connections to the phase windings, and to the control current and Hall voltage connectors of the Hall generators are designated 1–13. A diametrically magnetized rotor magnet is designated 20. As shown in FIG. 1, the ends of the phase windings 14–17 are connected together by means of a neutral conductor which is connected to terminal 7. The Hall generators 18 and 19 are shifted 90° relative to each other and to the associated phase windings 14–17.

In FIG. 2, the circuit according to FIG. 1 is shown in a different presentation on a circuit board 21 indicated by dash-dotted lines. The connections 1–13 at the circuit board 21 correspond to the connections to the phase windings, Hall generators and neutral terminal which are shown rearranged from FIG. 1. The connection points 1–13 are soldered to connecting lines which are brought to a mating connector plug 22, where they are soldered to the ends of connector pins to which are assigned the same designations as the corresponding connection points 1–13. Connector jack 23 mates with connector plug 22 and is connected to a commutation or control circuit 24 which is also arranged on a circuit board 24 indicated by dash-dotted lines. Only those parts of the control circuit which are essential for an understanding of the invention are shown, such as transistors 25–28 which are assigned to individual phase windings 14–17. The collectors of transistors 25–28 are connected to the terminals 1, 2, 13, 12, respectively, and thereby to the phase windings, and the bases of transistors 25–28 are connected to the voltage terminals 3, 5, 9, 11 respectively, and thereby to the Hall generators. The emitters of the transistors are connected by a common conductor 29 to one end of a resistor 30, the other end of which is connected to the negative pole of a voltage source. Two resistors 31 and 32 of equal resistance are connected into the control current circuit of the Hall generators 18 and 19 between the positive pole of the voltage source and the control current terminals 4 and 10, respectively. Also connected in the control current circuit of the Hall generators is another resistor 33 which is connected between the control current terminals 6 and 8 and the negative pole of the voltage source. The terminals of the control circuit 24 are referenced 1–13 corresponding to their intended connection with the terminals of circuit board 21 and are connected to corresponding jacks of connector jack 23.

If the connector plug 22 and jack 23 are connected to each other as shown in FIG. 2, clockwise rotation of the rotor 20 is obtained. If, however, the connector plug and jack are plugged together with one of them rotated 180° from the position shown in FIG. 2 so that terminal 13 of the jack 23 meets pin 1 of plug 22, etc., counterclockwise rotation of the rotor is obtained. Connections for the rotated configuration of connector plug 22 are indicated by the reference symbols in parantheses. Connection 7 is located on the axis of symmetry 36 of the connector jack 22 and plug 23, and, therefore, no change occurs between the normal and rotated configurations of the connector for connection 7. The connections of the Y-connected phase windings and the leads to the Hall generators 18 and 19 are arranged symmetrically about the connector axis 36.

In FIG. 3 is shown a circuit board 34 having a part 35 which forms part of a plug connector. The connector pins for the motor shown in FIGS. 1 and 2 are correspondingly designated 1–13. The connector pins 1 and 2 are connected with contacts 14' and 15' for the phase windings 14 and 15, respectively, and connector pins 12 and 13 are connected with contacts 17' and 16' for phase winding 17 and 16, respectively. Contacts 14' and 15' for phase windings 14 and 15, respectively, and contacts 17' and 16' for phase windings 17 and 16, respectively, are positioned symmetrically about the axis of symmetry of the circuit board which runs through pin 7 and contact 7'. The connector pins 3–6 are connected to the contacts for the Hall generator 19, and connector pins 8–11 are connected to the contacts for the Hall generator 18. These contacts are also arranged symmetrically about the axis of symmetry of the circuit board. Connector pin 7 is connected to a contact 7' for connection to the neutral point of the phase windings 14 to 17. When circuit board 34 is rotated 180° clockwise (or counterclockwise) about the axis running through connector pin 7 and contact 7', the positions of the connector pins are interchanged between the reference numerals inside and outside the parentheses shown for the connections to circuit board 21 in FIG. 2.

Thus, in accordance with the invention, the simple connector 22, 23 provides two mating connecting configurations in which no damage can occur to the motor or circuit. Additionally, the rotor rotates in one direction in one configuration and in the opposite direction in the other configuration.

The advantages of the present invention, as well as certain changes and modifications of the disclosed embodiment thereof, will be readily apparent to those skilled in the art. It is the applicants' intention to cover by their claims all those changes and modifications which could be made to the embodiment of the invention herein chosen for the purposes of the disclosure without departing from the spirit and scope of the invention.

What is claimed is:

1. A brushless d-c motor including an electric commutation circuit connected thereto and a mating connector for electrically inter-connecting the electric circuit to the motor, the connector comprising a plug having a plurality of symmetrically disposed connector pins and a jack having a plurality of symmetrically disposed connector jacks, each of the connector pins being uniquely electrically connected to one of the motor and the circuit and each of the connector jacks being uniquely electrically connected to the other of the motor and the circuit, the connector pins and the connector jacks being arranged and each of the connector pins and each of the connector jacks being electrically connected to the motor and circuit so that the plug and jack may be connected in only two configurations, one of the two configurations providing rotation of the motor in one direction and the other of the two configurations providing rotation of the motor in the opposite direction.

2. The motor recited in claim 1, wherein neutral connections to the motor and circuit are located on the axis of symmetry of the connector on respective parts of the connector, and interchangeable connections for reversing the direction of the motor are symmetrically located about the axis of symmetry on respective parts of the connector.

3. The motor recited in claim 1, wherein the motor includes Y-connected phase windings and Hall generators, and wherein the connections to the phase windings are arranged symmetrically about the axis of symmetry of the connector and the connections to the Hall generators are arranged symmetrically about said axis.

4. The motor recited in claim 3, wherein corresponding connections to the windings and corresponding connections to the Hall generators are interchangeable, the electric commutation circuit being operative to control the commutation of the motor and the motor rotating in opposite directions when corresponding connections to the windings and corresponding connections to the Hall generators are interchanged.

5. The motor recited in claim 3, wherein the connector is rectangular in shape and the axis of symmetry thereof is normal to opposed sides of the connector, the connection to the neutral point of the motor and circuit being on said axis and said connections being arranged in a line parallel to said sides, whereby 180° rotation of one of the parts of the connector interchanges said interchangeable connections.

6. The motor recited in claim 1 and further comprising a circuit board for connecting the plug to the motor.

7. The motor recited in claim 1, wherein the connector pins of the plug are connected to the circuit and the connector jacks of the jack are connected to the motor.

8. The motor recited in claim 1, wherein the connector pins and connector jacks are linearly symmetrically disposed.

9. The motor recited in claim 1, wherein the connector pins are of identical size and the connector jacks are of identical size.

10. In a brushless d-c motor having an electric commutation circuit and a mating connector for electrically inter-connecting the motor and the circuit, the connector comprising a plug having a plurality of connector pins and a jack having a plurality of connector jacks, the connector pins being electrically connected to one of the motor and the circuit and the connector jacks being electrically connected to the other of the motor and circuit, the improvement comprising the plug having symmetrically disposed connector pins and the jack having symmetrically disposed connector jacks, the connector pins and the connector jacks being arranged and each of the connector pins and each of the connector jacks being uniquely electrically connected to the motor and circuit so that the plug and jack may be connected in only two configurations, one of the two configurations providing rotation of the motor in one direction and the other of the two configurations providing rotation of the motor in the opposite direction.

11. The improvement recited in claim 10, wherein neutral connections to the motor and circuit are located on the axis of symmetry of the connector on respective parts of the connector, and interchangeable connections for reversing the direction of the motor are symmetrically located about the axis of symmetry on respective parts of the connector.

12. The improvement recited in claim 11, wherein the motor includes Y-connected phase windings and Hall generators, and wherein the connections to the phase windings are arranged symmetrically about the axis of symmetry of the connector and the connections to the Hall generators are arranged symmetrically about said axis.

13. The improvement recited in claim 12, wherein corresponding connections to the windings and corresponding connections to the Hall generators are interchangeable, the electric commutation circuit being operative to control the commutation of the motor and the motor rotating in opposite directions when corresponding connections to the windings and corresponding connections to the Hall generators are interchanged.

14. The improvement recited in claim 12, wherein the connector is rectangular in shape and the axis of symmetry thereof is normal to opposed sides of the connector, the connection to the neutral point of the motor and circuit being on said axis and said connections being arranged in a line parallel to said sides, whereby 180° rotation of one of the parts of the connector interchanges said interchangeable connections.

15. The improvement recited in claim 10 and further comprising a circuit board for connecting the plug to the motor.

16. The improvement recited in claim 10, wherein the connector pins of the plug are connected to the circuit and the connector jacks of the jack are connected to the motor.

17. The improvement recited in claim 10, wherein the connector pins and the connector jacks are linearly symmetrically disposed.

18. The improvement recited in claim 10, wherein the connector pins are of identical size and the connector jacks are of identical size.

19. A mating connector for electrically interconnecting a brushless d-c motor and its electric commutation circuit comprising a plug having a plurality of symmetrically disposed connector pins and a jack having a plurality of symmetrically disposed connector jacks, each of the connector pins being adapted to be uniquely electrically connected to one of the motor and the circuit and each of the connector jacks being adapted to be uniquely electrically connected to the other of the motor and the circuit, and the connector jacks and the connector pins being arranged and each of the connector pins and each of the connector jacks being adapted to be electrically connected to the motor and circuit so that the plug and jack may be connected in only two configurations, one of the two configurations providing rotation of the motor in one direction and the other of the two configurations providing rotation of the motor in the opposite direction.

20. The connector recited in claim 19, wherein neutral connections to be made to the motor and circuit are located on the axis of symmetry of the connector on respective parts of the connector, and interchangeable connections for reversing the direction of the motor are symmetrically located about the axis of symmetry on respective parts of the connector.

21. The connector recited in claim 20, wherein the connector is adapted to be connected to a motor which includes Y-connected phase windings and Hall generators, and wherein the connections to be made to the phase windings are arranged symmetrically about the axis of symmetry of the connector and the connections to be made to the Hall generators are arranged symmetrically about said axis.

22. The connector recited in claim 20, wherein corresponding connections to be made to the windings and corresponding connections to be made to the Hall generators are interchangeable, the electric commutation circuit being operative to control the commutation of the motor and the motor rotating in opposite directions when corresponding connections to be made to the windings and corresponding connections to be made to the Hall generators are interchanged.

23. The connector recited in claim 20, wherein the connector is rectangular in shape and the axis of symmetry thereof is normal to opposed sides of the connector, the connection to be made to the neutral point of the motor and circuit being on said axis and said pin and jack connections being arranged in a line parallel to said sides, whereby rotation of one of the parts of the connector 180° interchanges said interchangeable connections.

24. The connector recited in claim 20, and further comprising a circuit board for connecting the plug to the motor.

25. The connector recited in claim 19, wherein the connector pins of the plug are adapted to be connected to the circuit and the connector jacks of the jack are adapted to be connected to the motor.

26. The connector recited in claim 19, wherein the connector pins and the connector jacks are linearly symmetrically disposed.

27. The connector recited in claim 19, wherein the connector pins are of identical size and the connector jacks are of identical size.

28. A method for electrically interconnecting a brushless d-c motor and its electric commutation circuit with a mating connector having two mating configurations in which the motor and circuit are not damageable in either configuration, the method comprising the steps of selectively uniquely electrically connecting the motor to all connections of one mating part of the connector, selectively uniquely electrically connecting the circuit to all connections of the other mating part of the connector, and symmetrically arranging the connections in the mating parts such that the direction of rotation of the motor is reversed in the two mating configurations of the connector.

29. The method recited in claim 28 and further comprising linearly disposing the pins and jacks and locating the connections to the neutral point of the motor and circuit on the axis of symmetry of the connector and locating corresponding interchangeable connections for reversing the direction of the motor symmetrically about the axis of symmetry of connector.

* * * * *